(12) United States Patent
Kumeta et al.

(10) Patent No.: US 10,185,586 B2
(45) Date of Patent: Jan. 22, 2019

(54) SYSTEM, MIGRATION CONTROL METHOD, AND MANAGEMENT APPARATUS

(71) Applicant: FUJITSU LIMITED, Kawasaki-shi, Kanagawa (JP)

(72) Inventors: Tomoyuki Kumeta, Shiroi (JP); Yasuhiro Kawasaki, Kobe (JP); Keita Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/809,760

(22) Filed: Jul. 27, 2015

(65) Prior Publication Data

US 2016/0062785 A1 Mar. 3, 2016

(30) Foreign Application Priority Data

Sep. 1, 2014 (JP) .................................. 2014-177562

(51) Int. Cl.
*G06F 9/455* (2018.01)
*G06F 1/24* (2006.01)
*G06F 9/50* (2006.01)

(52) U.S. Cl.
CPC ............ *G06F 9/45558* (2013.01); *G06F 1/24* (2013.01); *G06F 9/50* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,400,162 | B1 * | 3/2013 | Jannson | G01R 31/3651 320/132 |
| 2009/0055507 | A1 | 2/2009 | Oeda | |
| 2011/0138384 | A1 * | 6/2011 | Bozek | H04L 41/0806 718/1 |

(Continued)

FOREIGN PATENT DOCUMENTS

| | | |
|---|---|---|
| JP | 2003-299248 | 10/2003 |
| JP | 2009-048607 | 3/2009 |

(Continued)

OTHER PUBLICATIONS

Uttam Mandal, "Greening the Cloud Using Renewable-Energy-Aware Service Migration", 2013, IEEE University of California, Davis.*

(Continued)

*Primary Examiner* — Wynuel S Aquino
(74) *Attorney, Agent, or Firm* — Oblon, McClelland, Maier & Neustadt, L.L.P.

(57) ABSTRACT

A system includes circuitry configured to determine available electric energy to be supplied to each of a plurality of servers over a predetermined period of time based on electric energy generated by alternative energy sources for each of the plurality of servers disposed at a plurality of geographically separate locations, each of the plurality of servers being configured to run a virtual machine. The circuitry is further configured to control a virtual machine running on a first server of the plurality of servers to migrate to a second server of the plurality of servers, which is determined to have a larger amount of available electric energy than the first server.

18 Claims, 10 Drawing Sheets

| MIGRATION SOURCE | MIGRATION DESTINATION | REQUISITE TIME |
|---|---|---|
| A COUNTRY | B COUNTRY | ×××MINUTES |
| A COUNTRY | C COUNTRY | ×××MINUTES |
| A COUNTRY | D COUNTRY | ×××MINUTES |
| B COUNTRY | C COUNTRY | ×××MINUTES |
| B COUNTRY | C COUNTRY | ×××MINUTES |
| C COUNTRY | D COUNTRY | ×××MINUTES |

(56) References Cited

U.S. PATENT DOCUMENTS

| | | | |
|---|---|---|---|
| 2011/0246669 A1 | 10/2011 | Kaneda et al. | |
| 2012/0054409 A1* | 3/2012 | Block | G06F 11/1484 |
| | | | 711/6 |
| 2015/0067692 A1* | 3/2015 | Berlin | G06F 9/5038 |
| | | | 718/103 |
| 2015/0227397 A1* | 8/2015 | Gogula | G06F 9/5094 |
| | | | 718/104 |
| 2016/0057039 A1* | 2/2016 | Htay | H04L 43/0876 |
| | | | 709/224 |

FOREIGN PATENT DOCUMENTS

| | | | | |
|---|---|---|---|---|
| JP | 2009-247188 | 10/2009 | | |
| JP | 2011-210032 | 10/2011 | | |
| WO | WO 2014003785 A1 * | 1/2014 | | G06F 9/5038 |

OTHER PUBLICATIONS

Office Action dated Feb. 13, 2018, in Japanese Patent Application No. 2014-177562 (with English-language translation).

* cited by examiner

| APPARATUS ID | RUNNING VM | RUNNING SYSTEM |
|---|---|---|
| M01 | VM01 | A COMPANY |
| M01 | VM02 | B COMPANY |
| M01 | VM03 | C COMPANY |
| ⋮ | ⋮ | ⋮ |

FIG. 4

| COUNTRY | LINE BANDWIDTH | SYSTEM SIZE |
|---|---|---|
| A COUNTRY | 1Gbps | ×××Pbyte |
| B COUNTRY | 10Gbps | ×××Pbyte |
| C COUNTRY | 5Gbps | ×××Pbyte |
| D COUNTRY | 1Gbps | ×××Pbyte |

FIG. 5

| MIGRATION SOURCE | MIGRATION DESTINATION | REQUISITE TIME |
|---|---|---|
| A COUNTRY | B COUNTRY | ×××MINUTES |
| A COUNTRY | C COUNTRY | ×××MINUTES |
| A COUNTRY | D COUNTRY | ×××MINUTES |
| B COUNTRY | C COUNTRY | ×××MINUTES |
| B COUNTRY | C COUNTRY | ×××MINUTES |
| C COUNTRY | D COUNTRY | ×××MINUTES |

SYSTEM, MIGRATION CONTROL METHOD, AND MANAGEMENT APPARATUS

CROSS-REFERENCE TO RELATED APPLICATION

This application is based upon and claims the benefit of priority of the prior Japanese Patent Application No. 2014-177562, filed on Sep. 1, 2014, the entire contents of which are incorporated herein by reference.

FIELD

The embodiments discussed herein are related to a system, a migration control method, and a management apparatus.

BACKGROUND

In recent years, virtualization technology in which a virtual machine is operated on a physical server is in general use. For example, in data centers, environments for running a virtual machine on a physical server using a virtualization program are on the rise. The virtualization program has a function of moving a virtual machine running on a physical server to a physical server in another data center. Such moving of a virtual machine is referred to as "migration".

The following technique is proposed using this migration function. First, data centers are disposed to be distributed geographically. Then, if electric energy consumed at a certain data center exceeds a predetermined power consumption threshold value, a data center having power consumption less than or equal to a specific threshold value is identified, and a virtual machine is caused to migrate to the identified data center. Such a technique is provided.

As related-art technical literature, Japanese Laid-open Patent Publication Nos. 2009-48607, 2003-299248, and 2009-247188 are disclosed.

Incidentally, data centers are generally receiving power from a power company. However, if it is assumed that a data center is receiving power only from a power company, it is sometimes not possible to operate a system in a stable manner by related-art techniques. For example, if a failure occurs in power distribution facilities, a power transmission and distribution network, or the like of the power company, and thus power supply is stopped, it is not possible to operate a system in a stable manner by related-art techniques.

SUMMARY

According to an aspect of the invention, a system includes circuitry configured to determine available electric energy to be supplied to each of a plurality of servers over a predetermined period of time based on electric energy generated by alternative energy sources for each of the plurality of servers disposed at a plurality of geographically separate locations, each of the plurality of servers being configured to run a virtual machine. The circuitry is further configured to control a virtual machine running on a first server of the plurality of servers to migrate to a second server of the plurality of servers, which is determined to have a larger amount of available electric energy than the first server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

With an embodiment of the disclosure, it is possible to operate a system in a stable manner. In the following, a detailed description will be given of a management apparatus, a migration control program, and an information processing system according to embodiments of the present disclosure with reference to the drawings. It is assumed that the present embodiment is applied to an information processing system including a plurality of data centers that provide virtual machines. In this regard, this disclosure is not limited to the embodiments. Also, it is possible to suitably combine each of the embodiments within a range of not causing a discrepancy between the processing contents.

First Embodiment

Configuration of Information Processing System According to Embodiment

Figure 1:
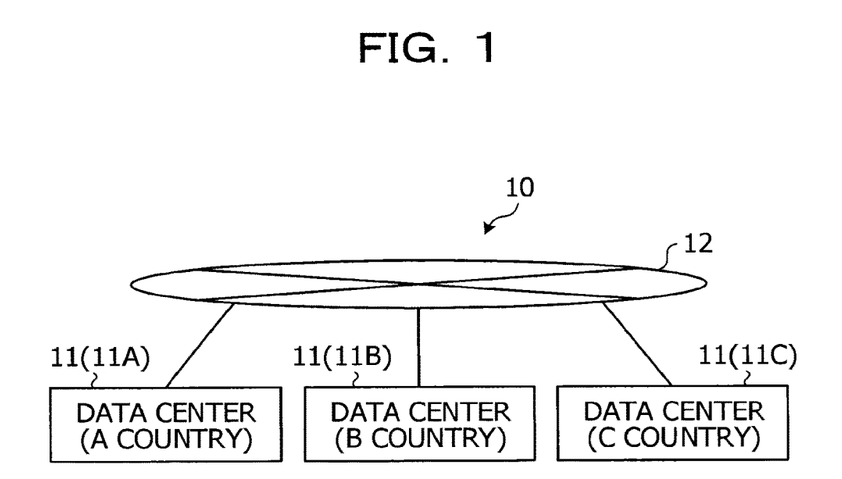
FIG. 1 illustrates a hardware configuration of an information processing system according to an embodiment.

FIG. 1 is a diagram illustrating a hardware configuration of an information processing system according to an embodiment. As illustrated in FIG. 1, an information processing system 10 includes a plurality of data centers (DCs) 11. The plurality of data centers 11 are individually connected through a network 12. The network 12 may be a dedicated line, or may not be a dedicated line. The information processing system 10 is a system in which migration of a virtual machine (VM) is possible between the individual data centers 11 through a network 12. In this regard, in the example in FIG. 1, three data centers 11 (11A, 11B, and 11C) are illustrated. However, it is possible to determine the number of data centers 11 to be any number as long as the number is two or more.

The data center 11 is capable of using electric power generated by alternative energy sources (natural energy) in addition to electric power supplied from a commercial power source, such as a power company, or the like as electric power for use. This alternative energy resources is energy that is replenished steadily or repetitively by power of nature, for example, sunlight, wind force, wave force, tidal power, flowing water, tide, geothermy, biomass, and the like. Electric power generation by alternative energy resources includes, for example, solar power generation, wind power generation, hydroelectric power generation, wave power generation, geothermal power generation, biomass power generation, and the like. In the present embodiment, a description will be given of the case where the data center 11 is capable of using electric power by solar power generation as electric power generated by alternative energy resources as an example.

Each data center 11 is disposed at a location separated geographically with each other such that if abnormality caused by a disaster or the like occurs at any one of the data centers 11, the other data centers 11 will not be affected by the abnormality. In the present embodiment, it is assumed that each of the data centers 11 is disposed at an area having a different sunshine time zone. For example, it is assumed that data centers 11A, 11B, and 11C are disposed in A country, B country, and C country, which have different sunshine time zones, respectively.

Hardware Configuration of Data Center

Figure 2:
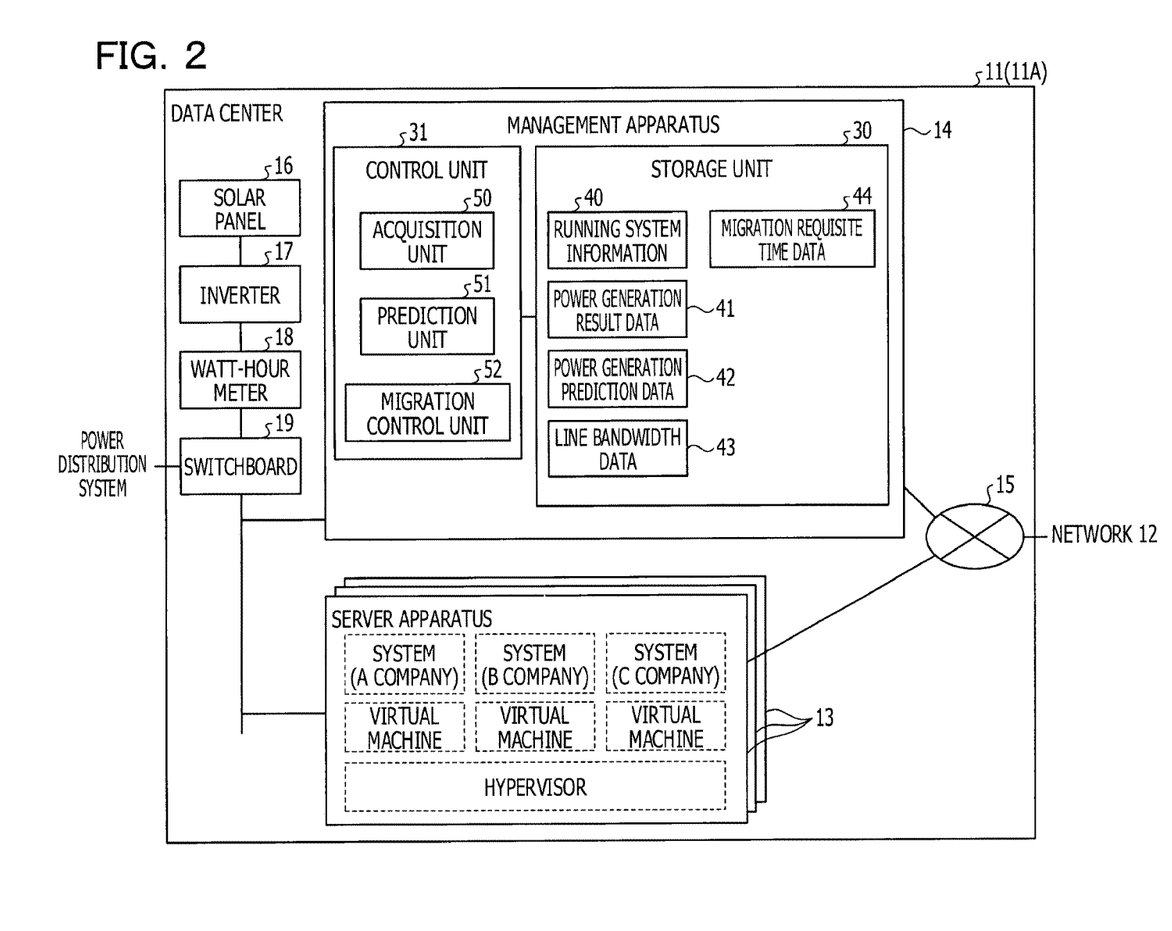
FIG. 2 illustrates a functional configuration of a data center according to an embodiment.

Next, a description will be given of a functional configuration of the data center 11 with reference to FIG. 2. FIG. 2 is a diagram illustrating a functional configuration of the data center according to the embodiment. In this regard, the functional configurations of the data centers 11A to 11C are substantially the same, and thus in the following, a description will be given of a configuration of the data center 11A as an example.

The data center 11 includes a plurality of server apparatuses 13, and a management apparatus 14. The plurality of server apparatuses 13 and the management apparatus 14 are connected through a network 15, and are capable of communication. The network 15 is connected to the network 12 in a communicable manner, and is allowed to communicate with the other data centers 11 through the network 12. In this regard, in the example in FIG. 2, three server apparatuses 13 are illustrated. However, it is possible to set the number of server apparatuses 13 to any number. Also, in the example in FIG. 2, one management apparatus 14 is illustrated. However, two or more management apparatuses 14 may be provided.

The server apparatus 13 is a physical server on which a virtual machine, that is to say, a virtualized computer, is operated in order to provide users with various services, and is a server computer, for example. The server apparatus 13 executes a server virtualization program so as to operate a plurality of virtual machines on a hypervisor, and thereby operate application programs in accordance with customers on the virtual machines so as to operate customer systems. In the example in FIG. 2, systems for A company, B company, and C company are running as customer systems.

The management apparatus 14 is a physical server that performs management and operation of the server apparatuses 13, and is a server computer, for example. The management apparatus 14 manages virtual machines that operate on the individual server apparatuses 13, and transmits a migration instruction of a virtual machine to each of the server apparatuses 13 in order to control migration of the virtual machines.

The management apparatus 14 of each data center 11 is capable of transmitting and receiving information with each other, and is capable of grasping the states of the other data centers 11 based on the information from the management apparatuses 14 of the other data centers 11. In the information processing system 10, any one of the management apparatuses 14 of the individual data centers 11 is operated as a management apparatus that manages the entire information processing system 10. The other management apparatuses 14 notify the states of the data centers 11, respectively to the management apparatus 14 that manages the entire information processing system 10. For example, a management apparatus 14 has a master-servant relationship among the management apparatuses 14 of the other data centers 11. The master-servant relationship among the management apparatuses may be set in advance by an administrator, or a program may set along with a predetermined setting procedure. A subordinate management apparatus 14 notifies the state of the data center 11 to the master management apparatus 14. The master management apparatus 14 notifies an instruction on operation of the data centers 11 to the subordinate management apparatuses 14 of the other data centers 11. For example, the master management apparatus 14 notifies a migration instruction of a virtual machine to the subordinate management apparatuses 14 of the other data centers 11. The subordinate management apparatuses 14 execute the instruction on operation of the data centers 11 in accordance with the instruction. For example, the subordinate management apparatus 14 instructs the server apparatus 13 on migration, and causes to carry out migration of a virtual machine in accordance with the migration instruction. In this regard, it is assumed that the management apparatus 14 to be a master in the master-servant relationship is referred to as a "lead". In the following, a description will be given on the assumption that the management apparatus 14 of the data center 11A is a "lead".

Also, the data center 11 includes a solar panel 16, an inverter 17, a watt-hour meter 18, and a switchboard 19 as equipment that supplies electric power to the plurality of server apparatuses 13, and the management apparatus 14.

The solar panel 16 is a panel for use in charging sunlight energy. The data center 11 is operated also using electric power generated by the solar panel 16. The inverter 17 electrically converts direct-current power generated by the solar panel 16 into alternating-current power, and supplies the converted alternating-current power to the switchboard 19 through the watt-hour meter 18. The watt-hour meter 18 measures the electric energy generated by sunlight energy, and supplied from the inverter 17 to the switchboard 19. That is to say, the watt-hour meter 18 measures electric energy generated by alternative energy resources. The electric energy measured by the watt-hour meter 18 is notified to the management apparatus 14. The switchboard 19 individually receives electric power from a power company through the power transmission and distribution network, and electric power from the inverter 17, and supplies the electric power supplied from both of them to the management apparatus 14, and the server apparatuses 13.

Configuration of Management Apparatus

Next, a description will be given of a configuration of the management apparatus 14 according to a first embodiment. As illustrated in FIG. 2, the management apparatus 14 includes a storage unit 30, and a control unit 31. In this regard, the management apparatus 14 may include various kinds of functional units included in a known computer in addition to the functional units illustrated in FIG. 2. For example, the management apparatus 14 may include a display unit that displays various kinds of information, and an input unit that inputs various kinds of information.

The storage unit 30 is a storage device that stores various kinds of data. For example, the storage unit 30 is a storage device, such as a hard disk, a solid state drive (SSD), an optical disc, or the like. In this regard, the storage unit 30 may be a semiconductor memory that allows rewriting data, such as a random access memory (RAM), a flash memory, a non-volatile static random access memory (NVSRAM), or the like.

The storage unit 30 stores an operating system (OS) and various programs that are executed by the control unit 31. For example, the storage unit 30 stores various programs including a program that executes the migration control processing described below. Further, the storage unit 30 stores various kinds of data used by the programs executed by the control unit 31. For example, the storage unit 30 stores running system information 40, power generation result data 41, power generation prediction data 42, line bandwidth data 43, and migration requisite time data 44.

The running system information 40 is data in which information on virtual machines and systems that are running on each of the server apparatuses 13. For example, in the running system information 40, virtual machines and systems that are running on server apparatuses 13 are stored in association with each other.

Figure 3:
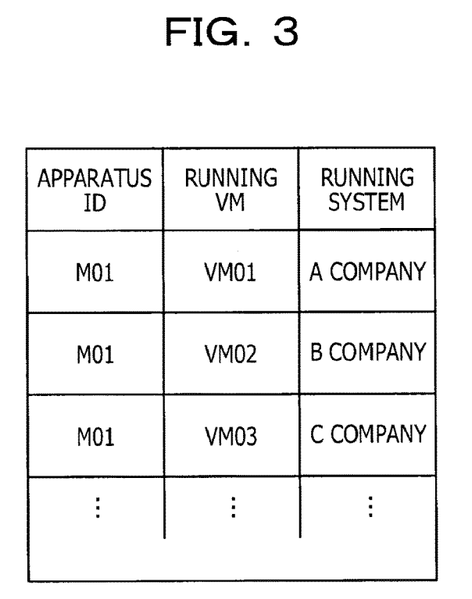
FIG. 3 illustrates an example of a data structure of a running system information.

FIG. 3 is a diagram illustrating an example of a data structure of the running system information. As illustrated in FIG. 3, the running system information 40 has individual items of "apparatus ID", "running VM", and "running system". The item apparatus ID is an area for storing identification information of a server apparatus 13. A server apparatus 13 is provided with an apparatus ID as identification information for identifying each apparatus. In the item apparatus ID, an apparatus ID that is given to that server apparatus 13 is stored. The item running VM is an area for storing identification information of a virtual machine that is running on the server apparatus 13 having the apparatus ID. A virtual machine is provided with a machine ID for identifying each machine as identification information for identifying each machine. In the item running VM, a machine ID that is given to the virtual machine running on the server apparatus 13 having the apparatus ID is stored. The item running system is an area for storing identification information of an identification information of a system that is running on the virtual machine. In the present embodiment, systems of A company, B company, and C company are running on the virtual machines, respectively. In the item running system, which company system is running on the virtual machine is stored.

The example in FIG. 3 illustrates that a virtual machine having the machine ID of "VM01" is running on the server apparatus 13 having the apparatus ID of "M01", and the "A company" system is running on the virtual machine.

The power generation result data 41 is data in which information on electric energy generated by alternative energy resources in the data center 11 is stored. In the power generation result data 41, electric energy generated by alternative energy resources is stored for each hour together with information on factors affecting power generation by alternative energy resources. The factors affecting the power generation is, for example, information on weather and sunshine hours in the case of solar power generation, and for example, wind force information in the case of wind power generation. In the present embodiment, electric energy generated by the solar panel 16 is stored together with hours and weather in the power generation result data 41.

The power generation prediction data 42 is data in which information on electric energy predicted to be generated by alternative energy resources from this time in the data center 11 is stored. In the present embodiment, data of electric energy predicted to be generated by the solar panel 16 is stored in the power generation prediction data 42.

The line bandwidth data 43 is data in which information on communication of each of the data centers 11 is stored. For example, data of line bandwidth available for communication in each of the data centers 11 is stored in the line bandwidth data 43.

Figure 4:
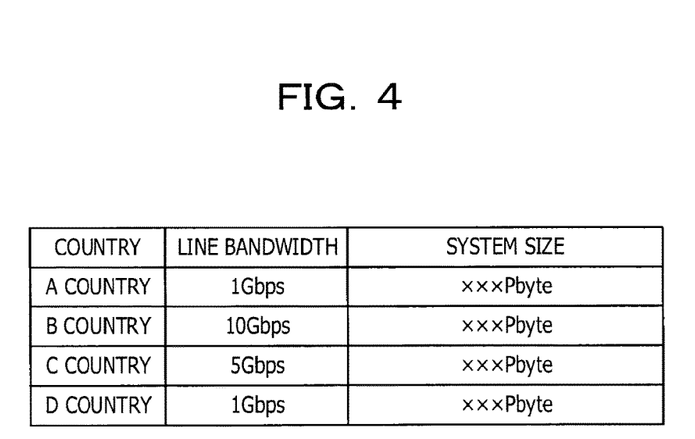
FIG. 4 illustrates an example of a data structure of line bandwidth data.

FIG. 4 is a diagram illustrating an example of a data structure of line bandwidth data. As illustrated in FIG. 4, the line bandwidth data 43 has individual items of "country", "line bandwidth", and "system size". The item country is an area for storing the location of the data center 11. The item line bandwidth is an area for storing a line bandwidth that the data center 11 is allowed for communication. The item system size is an area for storing the system size to be a migration target. In the present embodiment, systems of A company, B company, and C company are targeted for migration.

The example in FIG. 4 illustrates that the data center 11 of A country has a line bandwidth of 1 Gbps, and the system size of the migration target is xxx Pbytes. In the present embodiment, the system size of systems of A company, B company, and C company is xxx Pbytes.

The migration requisite time data 44 is data in which information on time to be taken for migration. For example, in the migration requisite time data 44, time to be taken at the time of completing migration of a system to a migration target at each data center 11 is stored.

Figure 5:
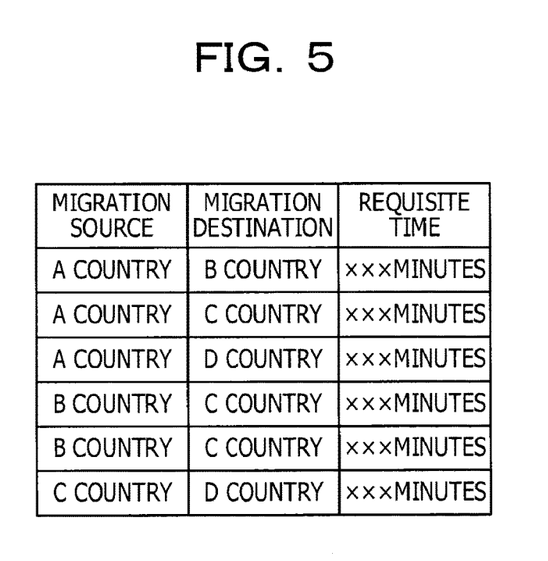
FIG. 5 illustrates an example of a data structure of migration requisite time data.

FIG. 5 is a diagram illustrating an example of a data structure of migration requisite time data. As illustrated in FIG. 5, the migration requisite time data 44 has individual items of "migration source", "migration destination", and "requisite time". The item migration source is an area for storing a location of the data center 11 to be a migration source of the system. The item migration destination is an area for storing a location of the data center 11 to be a migration destination of the system. The item requisite time is an area for storing requisite time taken for causing a migration-target system to migrate from the data center 11 of the migration source to the data center 11 to be the migration destination. The requisite time taken for completing the migration of a system to the migration target is obtained, for example by dividing the system size of the migration-target system by a lower line bandwidth out of the line bandwidth of the migration source and the line bandwidth of the migration destination.

The example in FIG. 5 illustrates that when a system of the migration target is moved from the data center 11 of A country to the data center 11 of B country, it takes xxx minutes.

Referring back to FIG. 2, the control unit 31 is a device for controlling the management apparatus 14. For the control unit 31, it is possible to employ an electronic circuit, such as a central processing unit (CPU), a micro processing unit (MPU), or the like, or an integrated circuit, such as an application specific integrated circuit (ASIC), a field programmable gate array (FPGA), or the like. The control unit 31 includes an internal memory for storing programs defining various processing procedures and control data, and executes various kinds of processing by the processing procedures and the control data. The control unit 31 functions as various processing units by operating the various programs. For example, the control unit 31 includes an acquisition unit 50, a prediction unit 51, and a migration control unit 52.

The acquisition unit 50 obtains various kinds of data. For example, the acquisition unit 50 obtains the power generation result data 41 from the management apparatuses 14 of the other each data centers 11. The power generation result data 41 may be transmitted periodically by the management apparatuses 14 of the other each data centers 11. Also, the acquisition unit 50 may request the management apparatuses 14 of the other each data centers 11 to transmit the power generation result data 41, and the management apparatuses 14 of the other each data centers 11 may transmit the power generation result data 41 in response to the request.

Also, the acquisition unit 50 obtains information on factors that affect generation of alternative energy resources for each of the data centers 11. For example, the acquisition unit 50 obtains weather information produced by predicting weather transition of each of the data centers 11. The weather information may be obtained from a server of a supplier who offers a service of providing weather information. Also, the weather information may be obtained from input by an administrator, or the like.

The prediction unit 51 makes various predictions. For example, the prediction unit 51 predicts transition of electric energy generated by alternative energy resources, which is available for each of the data centers 11. For example, the prediction unit 51 extracts power generation result in the case of having the same factors as the factors affecting power generation by alternative energy resources from the power generation result data 41 of the data center 11 for each data center 11, and predicts transition of the electric energy. For example, the prediction unit 51 extracts transition of a power generation result in the case of having the same weather as the weather indicated by the weather information of the data center 11 from the power generation result data 41 of the data center 11 as a prediction result for each data center 11. In this regard, the electric energy generated by alternative energy resources may be the average value of the electric energy generated at the same time in the same weather in the power generation result data 41. The prediction unit 51 stores the prediction value of the electric energy generated by alternative energy resources at each of the data centers 11 into the power generation prediction data 42.

The migration control unit 52 performs migration of a virtual machine. The migration control unit 52 performs control in order to cause a system to migrate to a data center 11 having a large amount of available electric energy generated by alternative energy resources of each of the data centers 11 stored in the power generation prediction data 42. For example, the migration control unit 52 causes a system to migrate to a data center 11 having a largest amount of available electric energy in a transition of available electric energy.

Figure 6:
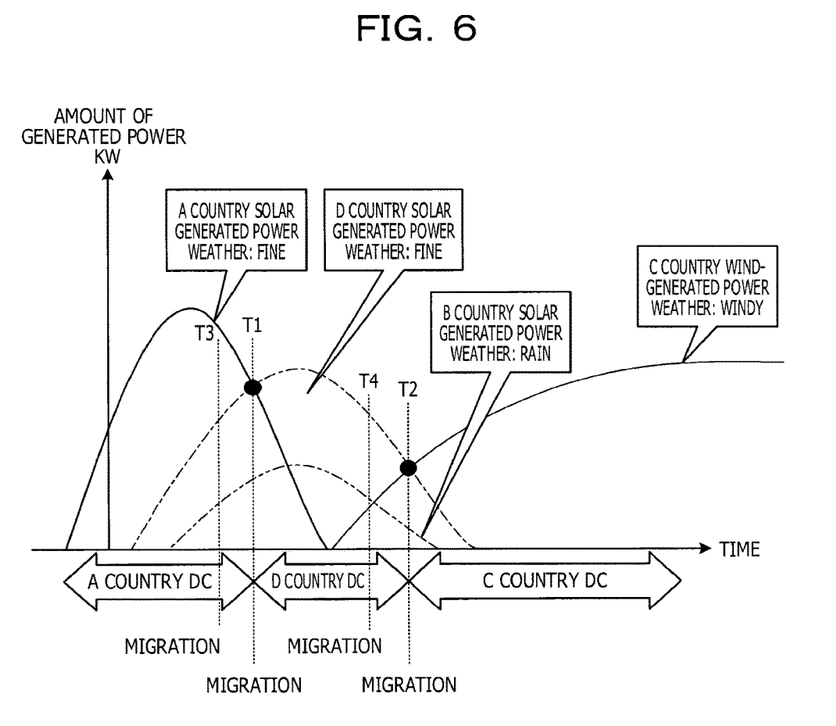
FIG. 6 illustrates an example of prediction results of transition of electric energy generated by each data center.

Here, a description will be given using a specific example. FIG. 6 is a diagram illustrating an example of prediction results of transition of electric energy generated by each data center. In the example in FIG. 6, prediction results of transition of electric energy generated by alternative energy resources in the data centers 11 of four countries, namely A country, B country, C country, and D country, are illustrated. In the example in FIG. 6, the graphs of A country, B country, and D country are transitions of electric energy generated by solar power generation. A country, B country, and D country have different sunshine time zones with one another, and thus have different power generation periods. Also, the predicted weather in A country, and D country is fine, and thus a large amount of electric energy is generated in these countries. On the other hand, the predicted weather in B country is rain, and thus a small amount of electric energy is generated in the country. Also, the graph of C country is a transition of electric energy generated by wind power generation. In the wind power generation, electric power is generated by wind, and thus is not affected by a sunshine time zone. Accordingly, the graph of C country is different from the graphs of A country, B country, and D country, and electric power is generated when a wind starts to blow.

The migration control unit 52 compares available electric energy of each of the data centers 11 for each time in the transition of predicted available electric energy in each of the data centers 11 to obtain timing when a data center 11 having a largest amount of available electric energy changes. In the example in FIG. 6, timing T1 is timing when a data center 11 having a largest amount of available electric energy is changed from the data center 11 of A country to the data center 11 of D country. Also, timing T2 is timing when a data center 11 having a largest amount of available electric energy is changed from the data center 11 of D country to the data center 11 of C country.

The migration control unit 52 determines the data center 11 before the change to be a data center 11 before migration, and the data center 11 after the change to be a data center 11 after migration at each obtained timing. The migration control unit 52 obtains a requisite time for migration from the data center 11 before migration to the data center 11 after migration from the migration requisite time data 44. When the time reaches a requisite time before the timing to change to a data center 11 having the largest available electric energy, the migration control unit 52 obtains a server apparatus 13 of the migration source on which a system caused to migrate is running, and a virtual machine caused to migrate from the running system information 40. The migration control unit 52 transmits a migration instruction of a virtual machine to migrate to the server apparatus 13 of the data center 11 after the change to the hypervisor of the server apparatus 13 of the migration source in order to cause the virtual machine to migrate. In this regard, if the migration control unit 52 instructs the server apparatus 13 of the other data centers 11 to migrate, the migration control unit 52 may transmit a migration instruction through the management apparatus 14 of the other data center 11.

In the example in FIG. 6, the migration control unit 52 causes a system to migrate from the data center 11 of A country to the data center 11 of D country at timing T3, which is a migration requisite time before the timing T1. Also, the migration control unit 52 causes a system to migrate from the data center 11 of D country to the data center 11 of C country at timing T4, which is a migration requisite time before timing T2.

Thereby, it is possible for the management apparatus 14 to complete migration of a system of a migration target in accordance with the timing T1 and T2, at which a data center 11 having the largest amount of available electric energy is changed.

When the migration is complete, the migration control unit 52 updates the server apparatus 13 on which a migration-target system is running in the running system information 40 in accordance with the migration results.

Processing Flow

Figure 7:
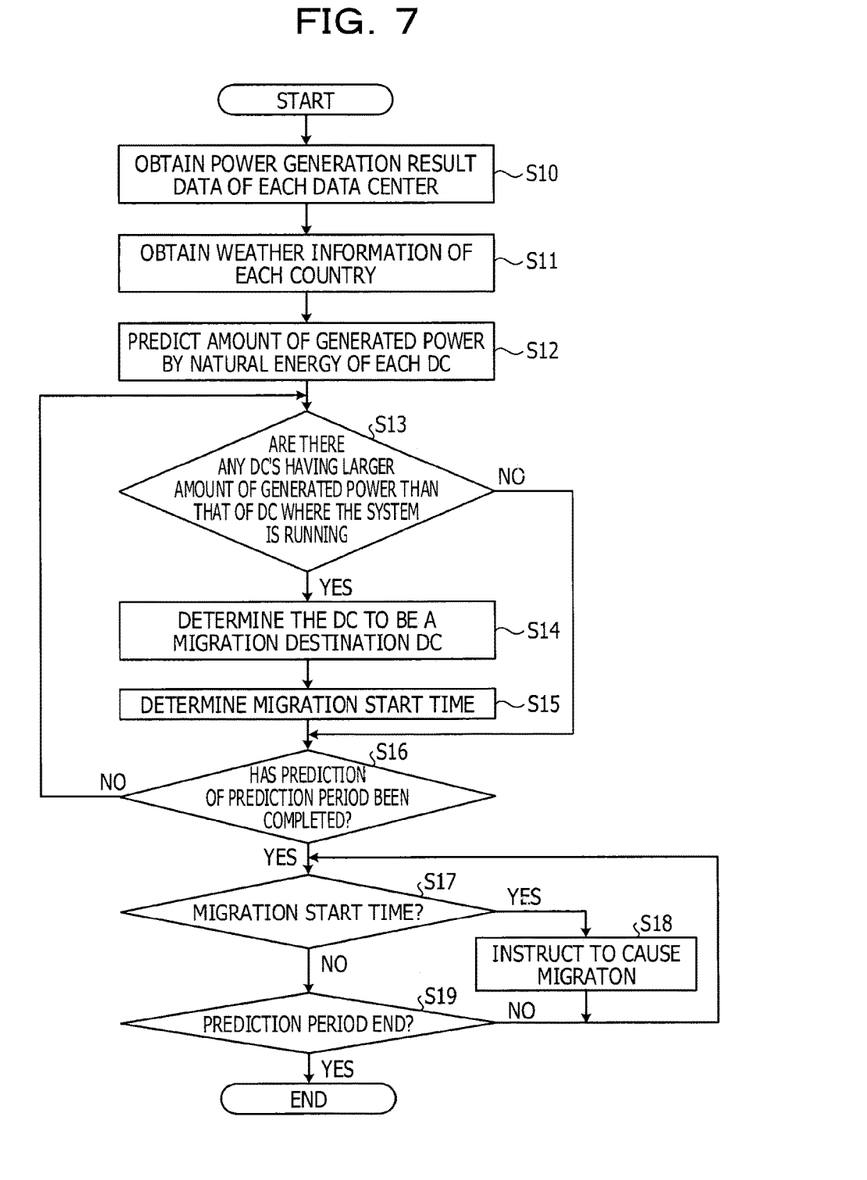
FIG. 7 is a flowchart illustrating an example of a procedure of migration control processing according to a first embodiment.

Next, a description will be given of a migration control processing flow that the management apparatus 14 according to the first embodiment controls migration of a virtual machine between each of the data centers 11. FIG. 7 is a flowchart illustrating an example of a procedure of migration control processing according to the first embodiment. The migration control processing is executed at predetermined timing, for example, once every day, or the like when prediction of transition of electric energy generated by alternative energy resources is performed at each of the data centers 11.

As illustrated in FIG. 7, the acquisition unit 50 obtains the power generation result data 41 from each of the data centers 11 (S10). The acquisition unit 50 obtains information on factors affecting the power generation by alternative energy resources in each of the data centers 11 (S11). For example, the acquisition unit 50 obtains weather information that predicts the transition of weather at each of the data centers 11. The prediction unit 51 predicts transition of individually available electric energy generated by alternative energy resources at each of the data centers 11 (S12).

The migration control unit 52 compares the transitions of predicted available electric energy of the individual data centers 11, and determines whether there is a data center 11 having a larger amount of available electric energy than that of the data center 11 on which a migration target system is running (S13). If there are no data centers 11 having a larger amount of available electric energy (S13 negation), the processing proceeds to S16 described later.

On the other hand, if there is a data center 11 having a larger amount of available electric energy (S13 affirmation), the migration control unit 52 determines the data center 11 after the change to be the data center 11 after migration (S14). The migration control unit 52 obtains the migration start time in accordance with the timing to change to the data center 11 having the largest available electric energy (S15). For example, the migration control unit 52 obtains the migration requisite time from the migration requisite time data 44. The migration control unit 52 obtains a migration start time, which is the requisite time before the timing to change to the data center 11 having the largest available electric energy.

The migration control unit 52 determines whether prediction of migration schedule has been completed for the prediction period in which the prediction unit 51 predicted transition of electric energy generated by alternative energy resources (S16). If the prediction has not been completed (S16 negation), the processing proceeds to S13 described above.

On the other hand, if the prediction has been completed (S16 affirmation), the migration control unit 52 determines whether the migration start time has come or not (S17). If the migration start time has come (S17 affirmation), the migration control unit 52 instructs migration of the migration target system (S18), and the processing proceeds to S17. On the other hand, if the migration start time has not come (S17 negation), the processing proceeds to S19.

The migration control unit 52 determines whether the prediction period during which the prediction unit 51 has predicted transition of electric energy generated by alternative energy resources has been completed or not (S19). If the prediction period has not been completed (S19 negation), the processing proceeds to S17 described above. On the other hand, if the prediction period has been completed (S19 affirmation), the processing is terminated.

Advantages

As described above, the management apparatus 14 according to the present embodiment predicts transition of available electric energy individually generated by alternative energy resources at data centers 11 that are separated geographically at a plurality of locations. The management apparatus 14 causes the system to migrate to a data center 11 having a large amount of predicted available electric energy. Thereby, it is possible for the management apparatus 14 to run a system stably. Also, the electric power supplied from a commercial power source includes the power generated by a nuclear power station and a thermal power station, and thus there are environmental problems, such as radioactivity problems, and global warming by $CO_2$ emissions, and the like. On the other hand, the management apparatus 14 operates a system using electric energy generated by alternative energy resources, and thus it is possible to operate a system ecologically with a suppressed load on the natural environment.

Also, the management apparatus 14 according to the present embodiment causes a system to migrate to a data center 11 having the largest available electric energy in the transition of the predicted available electric energy. Thereby, it is possible for the management apparatus 14 to stably operate a system even in the case where a large amount of electric energy is consumed by the system.

Also, the management apparatus 14 according to the present embodiment starts migration of a system to the data center 11 at a requisite time for migration to the data center 11 before the timing when the data center 11 having the largest amount of available electric energy is changed in the transition of predicted available electric energy. Thereby, it is possible for the management apparatus 14 to complete migration of a system to the data center 11 having the largest amount of available electric energy at the timing when the data center 11 having the largest amount of available electric energy is changed.

Second Embodiment

Next, a description will be given of a second embodiment. The configurations of the information processing system 10, the data center 11, the server apparatus 13, and the management apparatus 14 according to the second embodiment are the same as those of the first embodiment illustrated in FIGS. 1 and 2, and thus a description will be given of parts that are mainly different from the parts of the first embodiment.

The migration control unit 52 pauses migration of a system to the data center having a large amount of electric energy for a predetermined time period after the migration of the system.

Figure 8:
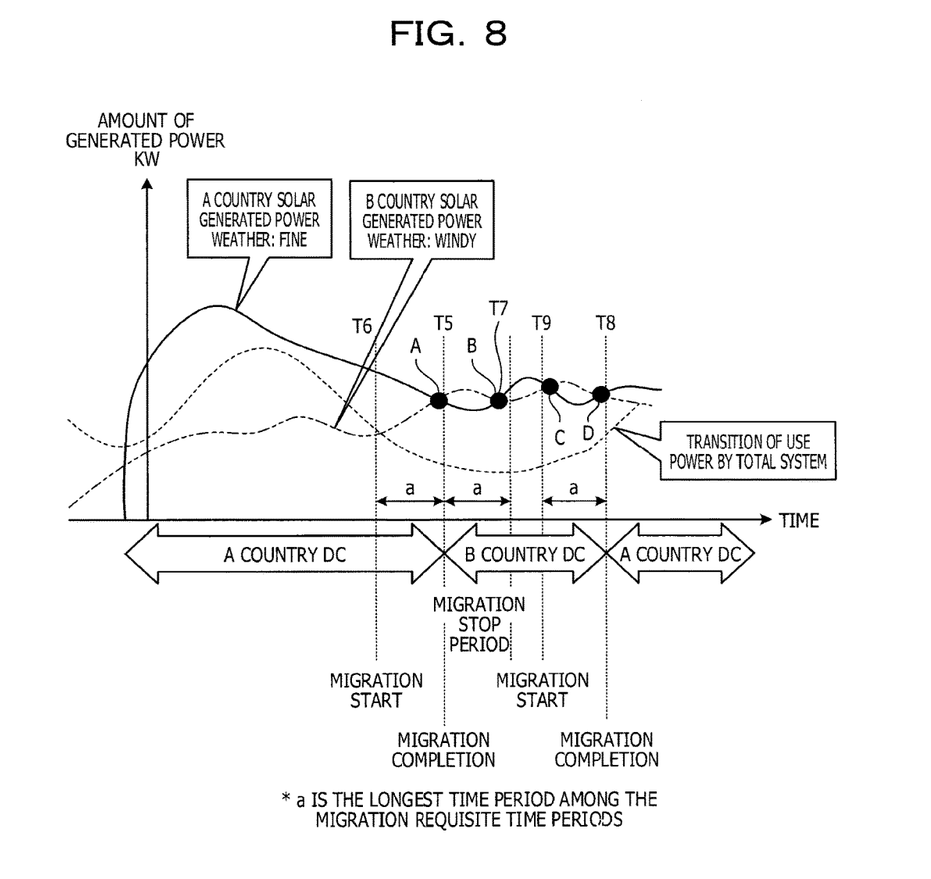
FIG. 8 illustrates an example of prediction results of transition of electric energy generated by each data center.

Here, a description will be given using a specific example. FIG. 8 is a diagram illustrating an example of prediction results of transition of electric energy generated by each data center. In the example in FIG. 8, prediction results of transition of electric energy generated by alternative energy resources in the data centers 11 of two countries, namely A country, and B country, are illustrated. In the example in FIG. 8, the graphs of A country, and B country are transitions of electric energy generated by wind power generation. The wind power generation is generating electric power by wind, and thus electric energy generated by wind force sometimes changes frequently. In the example in FIG. 8, the graphs of A country, and B country intersect at points A, B, C, and D. In this manner, in the case where a data center 11 having the largest amount of available electric energy changes frequently, if a system migrates to a data center 11 having the largest amount of available electric energy, migration of a system is carried out frequently, and thus the operation efficiency of the system is deteriorated.

Thus, even if a data center 11 having the largest amount of available electric energy changes, the migration control unit 52 does not transmit a migration instruction in order for the migration of the system to pause for a predetermined period after transmitting a migration instruction. For example, the migration control unit 52 causes the migration of the system to pause for the longest requisite time stored in the migration requisite time data 44 after transmitting a migration instruction.

In the example in FIG. 8, it is assumed that a migration requisite time between A country and B country is a, and a period for pausing the migration of the system is also the requisite time a. The migration control unit 52 causes the system to migrate from the data center 11 of A country to the data center 11 of the B country at timing T6, which is the requisite time before timing T5 of point A. Timing T7 of point B is within the requisite time a from the timing T6. Accordingly, the migration control unit 52 causes the migration of the system to pause at timing T7. The system is running on the data center 11 of B country, and thus the system is running on the data center 11 of B country without performing migration at point C. At point D, a data center 11 having the largest amount of available electric energy changes from B country to A country. Accordingly, the migration control unit 52 causes the system to migrate from the data center 11 of B country to the data center 11 of A country at timing T9, which is the requisite time a before timing T8 of point D.

Thereby, it is possible for the management apparatus 14 to avoid deterioration of operation efficiency of the system even in the case where the data center 11 having the largest amount of available electric energy changes frequently.

Processing Flow

Figure 9:
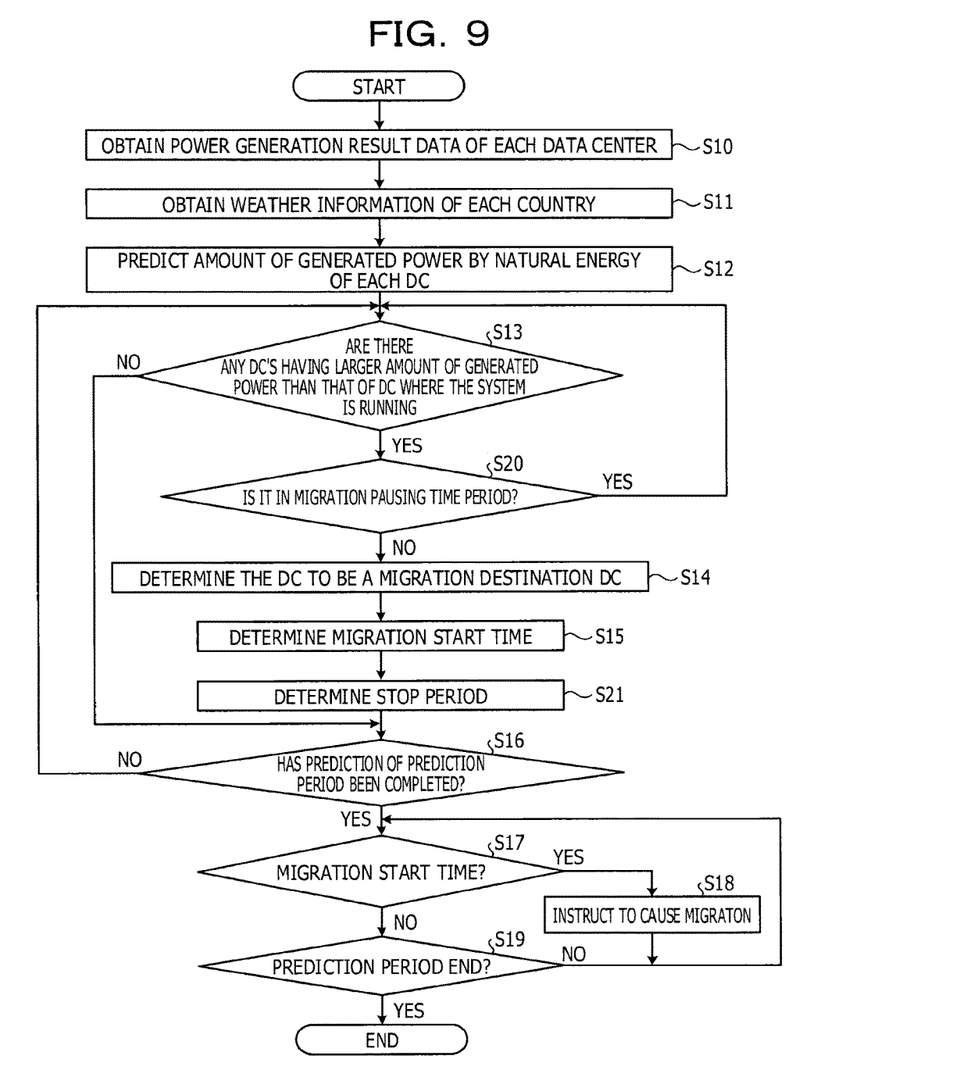
FIG. 9 is a flowchart illustrating an example of a procedure of migration control processing according to a second embodiment.

A description will be given of a migration control processing flow in which the management apparatus 14 according to the second embodiment controls migration of a virtual machine between the individual data centers 11. FIG. 9 is a flowchart illustrating an example of a procedure of migration control processing according to the second embodiment. In this regard, a same symbol is given to a same part of the migration control processing according to the first embodiment, which is illustrated in FIG. 7, and a description will be mainly given of different parts.

If there is a data center 11 having a larger amount of available electric energy (S13 affirmation), the migration control unit 52 determines whether the timing when the data center 11 having a larger amount of available electric energy changes is within the previous migration stop period or not (S20). If the timing is within the migration stop period (S20 affirmation), the processing proceeds to S13 described above, and the migration control unit 52 obtains the next timing when the data center 11 having a larger amount of available electric energy is changed.

Also, after the processing of S15, the migration control unit 52 determines that the longest requisite time stored in the migration requisite time data 44 from the timing when the data center 11 having the largest amount of available electric energy is changed is a stop period (S21), and the processing proceeds to S16.

Advantages

As described above, in the management apparatus 14 according to the present embodiment, migration of a system to the data center 11 having a larger amount of available electric energy pauses during a predetermined period after the system starts migration. Thereby, it is possible for the management apparatus 14 to avoid deterioration of operation efficiency of the system even in the case where a data center 11 having the largest amount of available electric energy changes frequently.

Third Embodiment

Now, descriptions have been given of an apparatus according to the embodiments of the disclosure. However, the disclosed technique may be carried out by the various modes other than the embodiments described above. Thus, in the following, a description will be given of the other embodiments included in the present disclosure.

For example, in the above-described embodiments, descriptions have been given of the cases of using solar power generation and wind power generation as power generation by alternative energy resources. However, the disclosed apparatus is not limited to this. For example, the power generation by alternative energy resources may be hydroelectric power generation, wave power generation, geothermal power generation, or biomass power generation. In the case where power generation by alternative energy resources is carried out at a place other than the data center 11, data on electric energy generated by alternative energy resources is obtained from a power generation source, and is stored in the power generation result data 41.

Also, in the above-described embodiments, descriptions have been given of the cases where a system is caused to migrate to a data center 11 having a larger amount of available electric energy generated by alternative energy resources. However, the disclosed apparatus is not limited to this. For example, in the case where electric energy consumed by a system is not less than electric energy generated by alternative energy resources, the system may be caused to migrate to a data center 11 having a larger amount of available electric energy generated by alternative energy resources. For example, the storage unit 30 stores used electric power data on the electric energy that has been used by each of the systems running on a virtual machine. Then, the prediction unit 51 predicts transition of electric energy consumed by the systems during a prediction period from the electric energy used by each of the systems in the similar period in the past based on the used electric power data. In the case where electric energy consumed by a system in the data center 11 where the system is running is not less than electric energy generated by alternative energy resources, the migration control unit 52 may cause the system to migrate to a data center 11 having a larger amount of available electric energy generated by alternative energy resources.

Also, each component of each apparatus illustrated in the figure is functionality-conceptually, and does not have to be physically configured as illustrated in the figure. That is to say, a specific state of distribution and integration of each apparatus is not limited to that illustrated in the figure, and it is possible to configure all of them or a part of them by functionally or physically distributing or integrating in any units in accordance with various loads, a use state, and the like. For example, each processing unit of the acquisition unit 50, the prediction unit 51, and the migration control unit 52 may be suitably integrated. Also, the processing of each processing unit may be suitably separated into a plurality of processing units. Further, it is possible to perform all of or any part of each processing function performed by each processing unit by the CPU and a program analyzed and executed by the CPU, or by wired-logic hardware.

Migration Control Program

Figure 10:
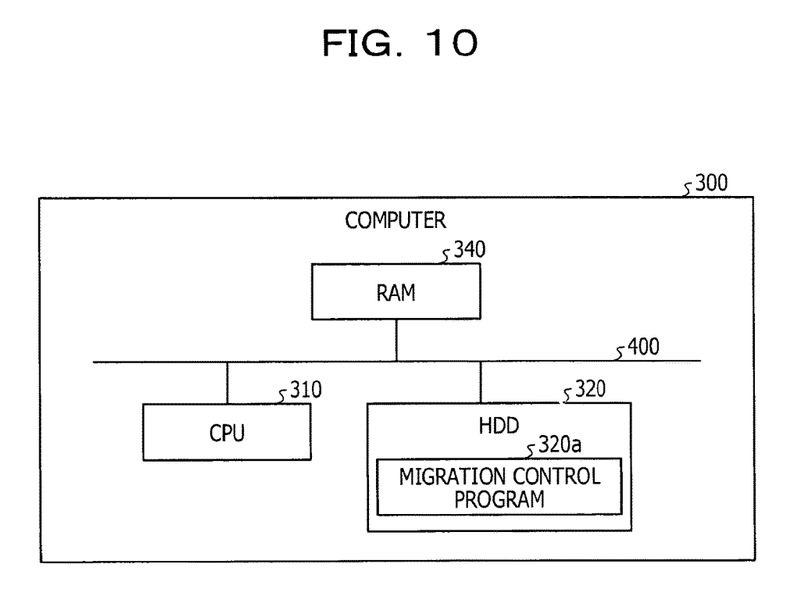
FIG. 10 illustrates a computer that executes a migration control program.

Also, it is possible to achieve various kinds of processing described in the above-described embodiments by executing prepared programs on a computer system, such as a personal computer, a workstation, or the like. Thus, in the following, a description will be given of an example of a computer system that executes a program having the same functions as those in the embodiments described above. FIG. 10 is a diagram illustrating a computer that executes a migration control program.

As illustrated in FIG. 10, a computer 300 includes circuitry such as a central processing unit (CPU) 310, a hard disk drive (HDD) 320, and a random access memory (RAM) 340. Each of the units 300 to 340 is connected through a bus 400.

The HDD 320 stores a migration control program 320a that has the same functions as the above-described acquisition unit 50, prediction unit 51 and migration control unit 52 in advance. In this regard, the migration control program 320a may be suitably separated.

Also, the HDD 320 stores various kinds of information. For example, the HDD 320 stores various kinds of data for use in the OS and production planning.

Then, the CPU 310 reads the migration control program 320a from the HDD 320, and executes the program so as to perform the same operation as that of each of the processing units in the embodiments. That is to say, the migration control program 320a performs the same operation as those of the acquisition unit 50, the prediction unit 51, and the migration control unit 52.

In this regard, the above-described migration control program 320a does not have to be stored in the HDD 320 from the beginning.

For example, the migration control program 320a is stored in a "portable physical medium", such as a flexible disk (FD), a CD-ROM, a DVD disc, a magneto-optical disc, an IC card, or the like that is inserted into the computer 300. Then, the computer 300 may read the program from these, and execute the program.

Further, "the other computers (or servers)" or the like that are connected to the computer 300 through a public network, the Internet, a LAN, a WAN, or the like may store the program. Then, the computer 300 may read the program from the other computers to execute the program.

All examples and conditional language provided herein are intended for the pedagogical purposes of aiding the reader in understanding the invention and the concepts contributed by the inventor co further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A system, comprising:
    circuitry configured to
        execute a first prediction of available electric energy to be supplied to each of a plurality of servers including at least a first server and a second server over a predetermined period of time based on electric energy generated by alternative energy sources for each of the plurality of servers disposed at a plurality of geographically separate locations, each of the plurality of servers being configured to run a virtual machine;
        execute, based on a result of the first prediction, a second prediction of a first timing when the available electric energy for the second server becomes larger than the available electric energy for the first server;
        determine a time period for executing a migration of a virtual machine running at the first server from the first server to the second server;
        determine, based on the first timing and the time period, a second timing to start the migration of the virtual machine from the first server to the second server, the second timing being determined so that the migration of the virtual machine is started before the first timing and is completed after the first timing; and
        control the virtual machine running on the first server to start the migration of the virtual machine to the second server at the second timing.

2. The system according to claim 1, wherein the system is a management apparatus including the circuitry configured to control the plurality of servers.

3. The system according to claim 1, wherein
    the system includes:
        the plurality of servers; and
        a management apparatus including the circuitry configured to control the plurality of servers, and
    the circuitry is configured to control migration of virtual machines run by each of the plurality of servers based on the determined available electric energy to be supplied to each of the plurality of servers.

4. The system according to claim 1, comprising:
    the plurality of servers; and
    a plurality of management apparatuses each including the circuitry configured to
        control one corresponding server included in the plurality of servers; and
        control a virtual machine run by the corresponding server to migrate to another server, which is determined to have a larger amount of available electric energy than the corresponding server.

5. The system according to claim 4, wherein the circuitry included in at least one of the plurality of management apparatuses is configured to control another management apparatus corresponding to the another server to perform the migration of the virtual machine.

6. The system according to claim 1, wherein the circuitry is configured to prevent migration of the virtual machine from the second server for a predetermined period of time after migration of the virtual machine from the first server to the second server.

7. The system according to claim 1, wherein the circuitry is configured to prevent migration of the virtual machine from the second server for a predetermined period of time after migration of the virtual machine from the first server to the second server even when it is determined that another server of the plurality of servers is determined to have a larger amount of available electric energy than the second server.

8. The system according to claim 1, wherein the available electric energy to be supplied to each of the plurality of servers is determined based on weather information corresponding to each of the plurality of locations at which the plurality of servers are located.

9. The system according to claim 1, wherein the circuitry is configured to control the virtual machine to migrate from the first server when electric energy consumed by the first server exceeds the available electric energy generated by the alternative energy source for the first server.

10. The system according to claim 9, wherein the available electric energy to be supplied to each of the plurality of servers is determined based on a history of power consumption by each of the servers over a similar time range.

11. A method of controlling migration, the method comprising:
    executing, by circuitry, a first prediction of available electric energy to be supplied to each of a plurality of servers including a first server and a second server over a predetermined period of time based on electric energy generated by alternative energy sources for each of the plurality of servers disposed at a plurality of geographically separate locations, each of the plurality of servers being configured to run a virtual machine;

executing, based on a result of the first prediction, a second prediction of a first timing when the available electric energy for the second server becomes larger that the available electric energy for the first server;

determining a time period for executing of migration of a virtual machine running on the first server from the first server to the second server;

determining, based on the first timing and the time period, a second timing to start the migration of the virtual machine from the first server to the second server, the second timing being determined so that the migration of the virtual machine is started before the first timing and is completed after the first timing; and controlling, by the circuitry, the virtual machine running on the first server to start the migration of the virtual machine to the second server at the second timing.

12. The method according to claim 11, further comprising:

controlling, by the circuitry, the virtual machine running on the first server to migrate to the second server when it is determined that the second server has a largest amount of available electric energy among the plurality of servers.

13. The method according to claim 11, further comprising:

preventing, by the circuitry, migration of the virtual machine from the second server for a predetermined period of time after migration of the virtual machine from the first server to the second server.

14. The method according to claim 11, further comprising:

preventing, by the circuitry, migration of the virtual machine from the second server for a predetermined period of time after migration of the virtual machine from the first server to the second server even when it is determined that another server of the plurality of servers is determined to have a larger amount of available electric energy than the second server.

15. The method according to claim 11, wherein the available electric energy to be supplied to each of the plurality of servers is determined based on weather information corresponding to each of the plurality of locations at which the plurality of servers are located.

16. The method according to claim 11, further comprising:

controlling virtual machine to migrate from the first server when electric energy consumed by the first server exceeds the available electric energy generated by the alternative energy sources for the first server.

17. The method according to claim 16, wherein the available electric energy to be supplied to each of the plurality of servers is determined based on a history of power consumption by each of the servers over a similar time range.

18. One or more non-transitory computer readable medium including one or more computer-programs, which when executed by a system, cause the system to:

execute a first prediction of available electric energy to be supplied to each of a plurality of servers including a first server and a second server over a predetermined period of time based on electric energy generated by alternative energy sources for each of the plurality of servers disposed at a plurality of geographically separate locations, each of the plurality of servers being configured to run a virtual machine;

execute, based on a result of the first prediction, a second prediction of a first timing when the available electric energy for the second server becomes larger that the available electric energy for the first server;

determine a time period for executing of migration of a virtual machine running on the first server from the first server to the second server;

determine, based on the first timing and the time period, a second timing to start the migration of the virtual machine from the first server to the second server, the second timing being determined so that the migration of the virtual machine is started before the first timing and is completed after the first timing; and control the virtual machine running on the first server to start the migration of the virtual machine to the second server at the second timing.

* * * * *